Inventor
Thomas L. Hallenbeck
By Harry O. Ernsberger
Attorney

Patented Feb. 17, 1953

2,628,413

UNITED STATES PATENT OFFICE 2,628,413

TURRET CONTROL MECHANISM

Thomas L. Hallenbeck, Toledo, Ohio, assignor to Baker Bros. Inc., Toledo, Ohio, a corporation of Ohio Application May 16, 1947, Serial No. 748,633

8 Claims. (Cl. 29—38)

1

This invention relates to an apparatus for controlling mechanism and more especially to an apparatus for regulating or controlling the speed of an electrically energized motor especially adapted for driving heavy loads.

The invention comprehends the provision of a driving means or system for operating mechanism whereby the speed of the motor may be controlled through the employment of fluid resistance.

The invention embraces the provision of a drive for mechanism utilizing an induction motor of a type having high slip, high torque characteristics wherein the operation of the motor may be controlled through the control of fluid flow through a fluid pump connected with the motor.

An object of the invention resides in the provision of a driving means for a mechanical element wherein it is desirable to periodically start and stop the element in a comparatively short period of time and wherein the drive means is arranged to move the mechanical element successively to fixed stations or positions without injury to the indexing or positioning mechanism.

Another object of the invention resides in the provision of a driving means for a relatively movable machine tool work supporting table or machine element of considerable weight wherein the driving means is controlled by fluid resistance acting to resist the inertia of the moving work supporting table so as to quickly bring the same to a position of rest.

Another object of the invention is the provision of a driving and controlling means for a movable machine element wherein a high torque, high slip induction motor is connected to the machine element and to a fluid pump, the latter being provided wtih fluid flow control or regulating means arranged whereby fluid resistance regulates or controls the motor speed providing a simple and effective means for rapidly reducing the speed of or stopping the motor and element driven thereby.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

2

In the utilization or operation of comparatively large machine tools and especially those of the character having a relatively movable or rotatable work supporting table, the movement or indexing of such work supporting table to successive positions has presented many difficulties. In large machines the work supporting table may have a weight of several thousand pounds which is augmented by the weight of castings, forgings or metal pieces carried thereby upon which work operations are to be performed. In carrying on successive machining operations upon work such as drilling, boring, reaming, facing and the like, it is customary to shift the position of the work supporting table from one station or position to the next station. It is imperative that the table moving or indexing time between stations be reduced to a minimum in order not to hamper production. Indexing is usually accomplished by the use of pawl or latch means arranged to be received in a recess to securely and accurately position the table at each station. The work and work supporting table have a high inertia factor when in operation, which must be counteracted or overcome in bringing the work supporting table to a static position. The latch mechanism forms an abutment means against which the inertia of the moving table is directed, and in prior mechanisms was subjected to severe shock which caused extensive wear and damage to the latch mechanism. Any wear of the abutment means soon results in an improper or inaccurate "setting" or indexing of the work supporting means. Thus, heretofore the life of a latching means has been comparatively short.

Figure 1:
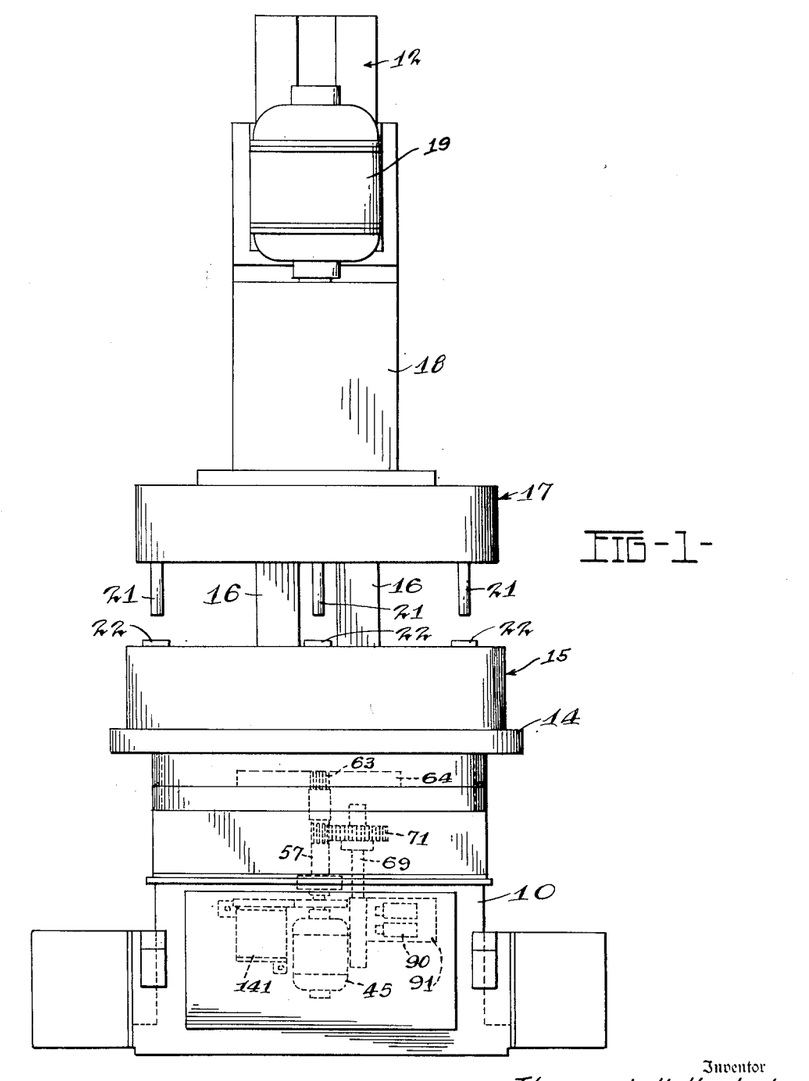
Figure 1 is a front elevation view of a machine tool embodying a form of my invention.

Applicant's present invention is inclusive of a simplet yet effective means utilizing a high slip, high torque motor operable to move the table quickly from station to station in combination with a counteracting force adaptable to resist the inertia of the table and work supported thereby when the table approaches indexing position so that the indexing or latching means is not subjected to any appreciable force and the life of the latching means therefore greatly prolonged. Referring to the drawings in detail there is illustrated in Figure 1 a machine tool of a character particularly adapted for performing drilling or similar machining operations upon pieces of work. The machine is inclusive of a base portion or frame 10 upon which is mounted an upright frame 12. The base portion 10 supports a work carrying table or platen 14 which revolves about a central axis to move the work to successive stations where machining, drilling, reaming or other operations may be performed upon the work. The work pieces are mounted upon suitable fixtures indicated at 15 mounted upon the table 14. In the machine illustrated, the upright frame 12 is formed with a pair of vertically disposed parallel ways 16 upon which is slidably mounted a tool carrying head or member 17. The head 17 is inclusive of a housing 18 which encloses and supports a plurality of tool actuating gears or mechanism (not shown) for operating rotatable tools, for example, drills, reamers or the like. In a machine of this character it is usual to provide several stations upon which the different machining operations may be carried on simultaneously upon a plurality of work pieces so that the rotatable tools for performing several machining operations are arranged in groups, one for each work performing station, for operation upon several pieces of work. Mounted upon the tool supporting head or member 17 is an electrically energized motor 19 which serves to rotate the several tools carried by the head 17. The head 17 is moved vertically to bring the tools into and out of engagement with the pieces of work by hydraulic or other suitable means (not shown).

As shown in Figure 1, the head 17 is provided with depending shafts or pilots 21 which are adapted to cooperate with guide bushings 22 carried by the work suporting fixture 15 or by the table 14 so that when the tool carrying head moves downwardly to bring the tools into engagement with the work pieces, the pilot pins are received into the bushings 22 to prevent relative rotatable movement of the work table during drilling or other machining operations.

In machines of the character disclosed in Figure 1, the table 14 is moved or rotated after each work performing operation to successive positions or stations so that additional work operations may be performed by the groups of rotatable tools carried by the head 17. The present invention is inclusive of means for effecting successive and intermittent movements of the work carrying table to various positions and to means for controlling the movement of the table so that damage or wear of the table locating or indexing means is greatly reduced or eliminated.

Figure 4:
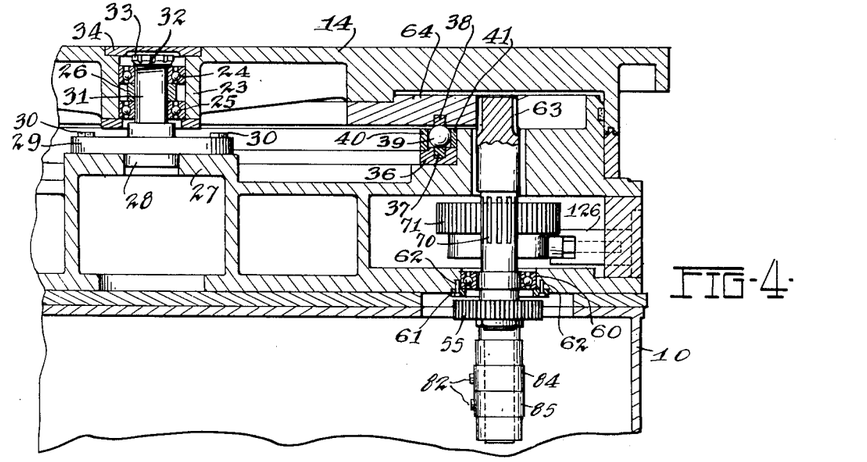
Figure 4 is a vertical sectional view taken substantially on the line 4—4 of Figure 2.

As particularly shown in Figure 4, the table 14 is formed with a central hub portion 23 which is centraly bored to accommodate a pair of antifriction bearings 24 and 25 preferably of the ball type and which are spaced by means of a suitable colar 26. The frame 10 is formed with a central pedestal portion 27 which is bored to receive a cylindrical tenon 28 formed upon a plate 29 which is secured by means of screws 30 to the pedestal 27. Associated with the plate 29 is an upwardly projecting shaft portion 31 upon which is fitted the bearings 24 and 25. The upper end of the shaft 31 is threaded as at 32 to accommodate a retaining nut 33 to hold the bearings 24 and 25 and the spacing collar 26 in position in the hub 23 of the table. An access opening in the upper central portion of the table 14 is normally closed by means of an escutcheon plate 34 to prevent the ingress of dirt and foreign matter in the bearings 24 and 25.

Mounted upon the base frame 10 is an annularly shaped member 36 which is provided with a recess adapted to receive a ring 37 of hardened metal or the like. The table 14 is formed with an annular recess adapted to receive a similarly shaped member 38 also of hardened material. Disposed between the members 37 and 38 is a plurality of bearing balls 39 or other suitable antifriction bearing means, the latter being adapted to support the table 14. The bearing balls 39 are maintained in a suitable race way formed by annular members 40 and 41 which are mounted upon the ring 36. The bearing means 39 supports the weight of and resists the downward thrust of the table and the work supported thereby while the bearing means 24 and 25 at the center of the table properly and accurately position the table for rotation about the axis of shaft 31.

Figure 3:
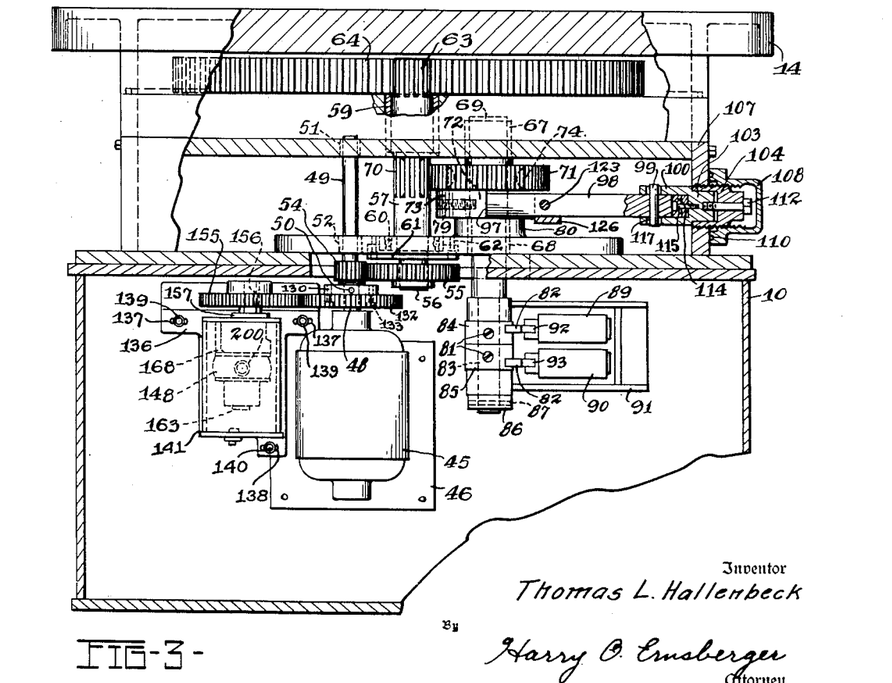
Figure 3 is a vertical sectional view taken substantially on the line 3—3 of Figure 2.

The driving means for the table 14 is inclusive of an electrically energized motor 45 mounted upon a plate 46, the latter being secured to the base frame 10 of the machine as shown in Figure 3. In the arrangement illustrated, the motor shaft 48 projects upwardly and into a central bore formed in a shaft 49, the latter being secured to the shaft by means of a pin 50 or other means. The shaft 48 is journaled in suitable bearings indicated at 51 and 52. Formed on the shaft 48 is a pinion 54 which meshes with a driven gear 55 mounted upon a tenon 56 of a shaft 57. The axis of the latter being parallel with the shaft 48. The shaft 57 is journaled at its upper end in a bearing or bushing 59 and is journaled at its lower end in a ball bearing 60 which is supported upon the frame 10 of the machine by means of an annular plate 61 held in place by means of screws 62. The upper extremity of the shaft 57 is formed with teeth to provide a drive pinion 63 which meshes with a ring gear 64 secured to the table 14. Thus rotation of the motor shaft 48 drives the shaft 57, rotating pinion 63 to revolve the work supporting table 14.

The base frame 10 is provided with a pair of aligned openings accommodating bearing sleeves 67 and 68 within which is journaled a shaft 69 arranged with its axis parallel with the shaft 57. The shaft 57 has an intermediate portion formed with teeth to provide a gear 70 which is enmeshed with a larger gear 71. Mounted upon shaft 69 is a member 73 having a portion 74 of lesser diameter than the lower portion of member 73 and upon which is mounted the gear 71. The gear is fixed to member 73 by means of diametrically opposed keys 75, the portion 72 of shaft 69 being provided with a recess adapted to receive the extremity of a locking screw 79 carried in a suitable threaded bore in member 73 for fixedly securing the latter to the shaft. The shaft 69 is held in its bearings by engagement of member 73 engaging an upwardly extending boss portion 80 formed on the base frame 10.

The lower portion of the shaft 69 is of reduced diameter as indicated at 83 which is adapted to receive sleeves 84 and 85 which are formed with suitable cams or projections 82 for actuating electric circuit control mechanism. The cam members or sleeves 84 and 85 are rotatably adjustable upon the shaft portion 83 and are held in adjusted position by means of set screws 81, so that the proper timing for actuation of the electric switches may be obtained. The cam sleeves are supported upon the shaft portion 83 by means of a collar 86 which is secured to the shaft by means of a pin 87. The circuit controlling switches 89 and 90 are mounted upon a sub-frame 91 which is secured to the base frame 10. Each of the switches 89 and 90 is contained in a suitable housing, the switches being provided with rollers or members 92 and 93, which are arranged to be engaged by projections 82 on sleeves 84 and 85 to control the circuit of the motor 45.

Figure 2:
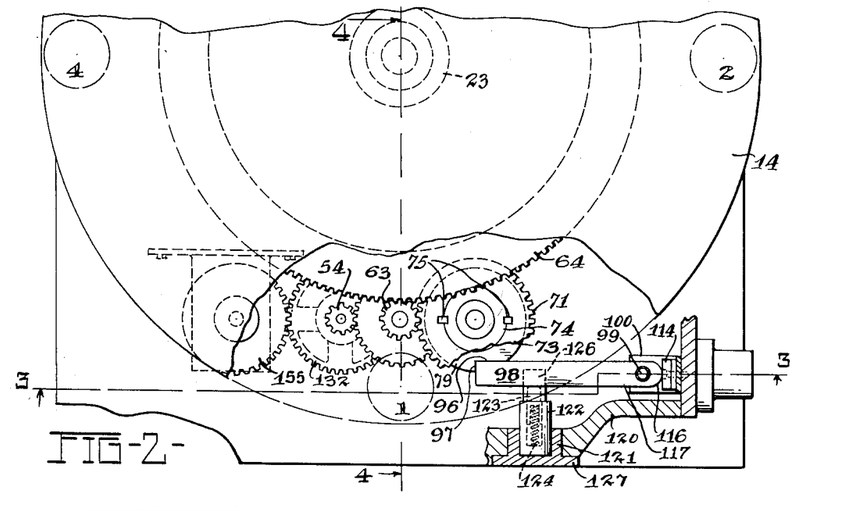
Figure 2 is a top plan view showing a portion of the work supporting table of the machine, certain parts being broken away and others in section for purposes of illustration.

The member 73 is formed with a notch or recess 96 having a radially disposed wall 97 which forms a ledge or abutment which is adapted for engagement with an indexing pawl or member 98. The pawl 98 is connected by means of a pivot pin 99 carried in a clevis-like member 100 which is formed with a cylindrical tenon 103 which is contained in a cylindrical recess formed in a member 104. The exterior surface of member 104 is threaded and adapted to extend into a threaded bore contained in a housing plate 107. The member 104 is enclosed with a cap or closure 108 which is internally threaded and adapted to be received upon the threaded portion of member 104. The end closure 108 is provided with a recess or annular groove adapted to receive a sealing gasket 110. Thus when the closure 108 is threaded on to the member 104, the gasket 110 is compressed against the exterior surface of frame plate 107 to seal the interior of cap 108, the latter also serving as a lock nut to securely hold the member 104 in the plate 107. The tenon 103 is threaded to receive the threaded end of a bolt 112 to secure tenon 103 to the member 104. The purpose of tenon 103 and bolt 112 is to adjust the member 100 rotationally about its longitudinal axis to properly align the pawl 98 with the recess 96 in cam member 73. The member 100 is fitted with a block or abutment 114 which is secured in place by means of a screw 115 which is arranged to contact the rear semi-cylindrical surface 116 formed upon the end of the latch or pawl 98. The pin 99 carried by the latch or pawl 98 extends into openings 117 formed in the projecting portions of member 109, the diameter of the openings being larger than the diameter of the pin 99 so that the latch or pawl 98 is capable of limited relative movement with respect to the member 100. The hardened block or abutment 114 is arranged to be contacted or engaged by the surface 116 of latch 98 without the pin 99 contacting the bounding walls of openings 117. Through this arrangement, the thrust of the table indexing operation which may be transmitted longitudinally of the latch 98 and in a direction toward the abutment block 114 is absorbed and resisted by the latter to obviate the wear of the pin 99 or walls of the openings 117. Thus during indexing operations, when the latch 98 is subjected to thrust, the hardened block 114 will absorb such thrust and thus greatly prolong the life of the indexing mechanism.

The frame plate 107 is secured to a member 120 forming part of the frame 10 of the machine. The member 120 is bored to receive a bushing 121 within which is disposed a cylindrical member 122, the latter being centrally bored to accommodate a plunger 123. The plunger 123 is urged outwardly under the influence of an expansive coil spring or other resilient means 124 contained within the bore formed in the member 122. The extremity of the plunger 123 is arranged to contact or engage the pawl or latch 98 as shown in Figure 2, which serves to urge the pawl into contact with the cam or cam wheel 73 for indexing or positioning the work supporting table 14. The latch is guided or supported adjacent the plunger 123 by means of a ledge portion 126 associated with member 122. The bushing 121 is integrally formed with a head portion 127 which is secured to frame member 120 by means of screws (not shown).

Means are provided for reacting against rotation of or absorbing the torque of the motor so as to efficiently and effectively control the stopping and indexing of the work supporting table. In the preferred embodiment I have shown a fluid resistance means for accomplishing this purpose and function. To this end there is mounted upon the shaft or sleeve 49, carried by motor shaft 48, a member 130 secured thereto by means of a key (not shown). Also connected to member 130 is a gear 132 which is secured to the member 130 by suitable securing screws 133 or other suitable means.

Mounted upon the plate 46, which carries the motor 45, is a member 136. The member 136 is formed with elongated slots 137 at its upper portion and a third elongated slot 138 at its lower portion which are adapted to receive securing means in the form of screws 139 and 140. By manipulation of the screws 139 and 140 the member 136 may be adjusted with respect to the supporting frame or plate 46 to bring the gears 132 and 155 into proper enmeshment.

Figures 6, 7, 8, 9, 10:
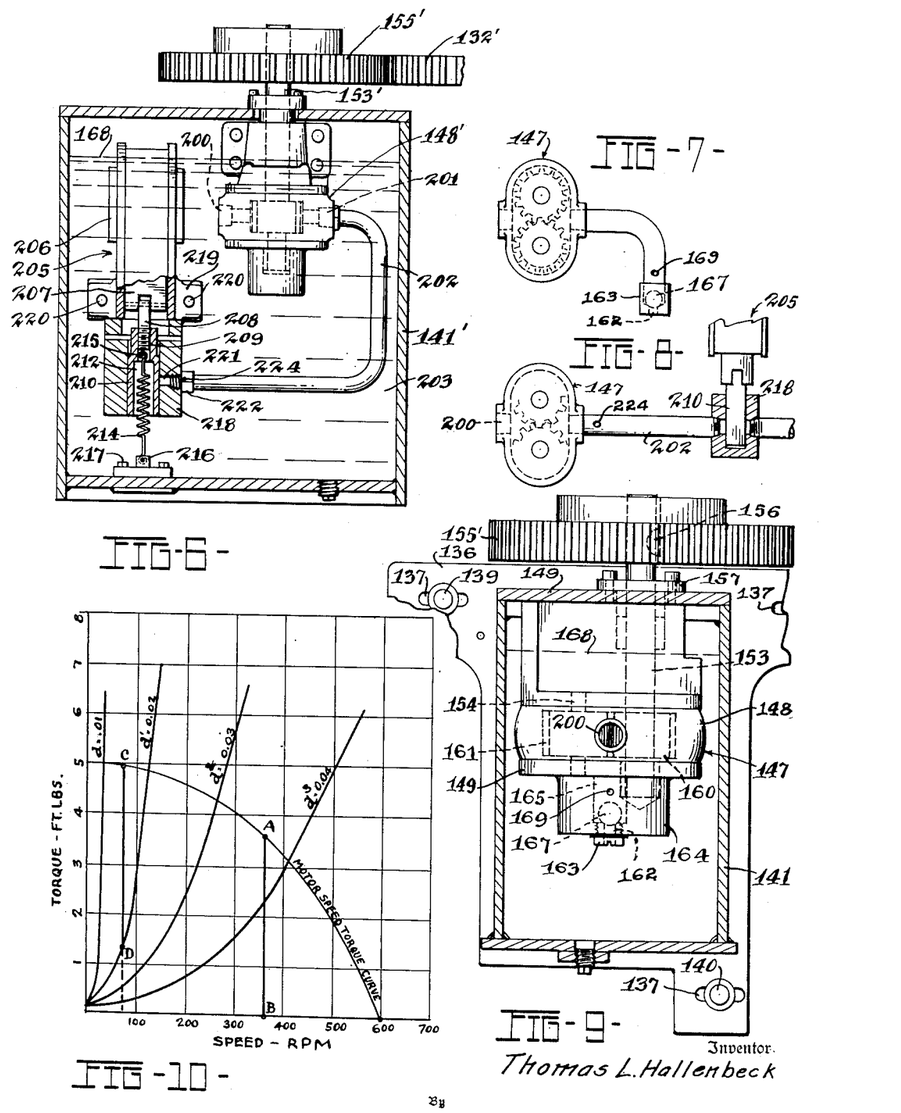
Figure 6 is a sectional view through a fluid reservoir showing a pump construction and solenoid controlled fluid flow regulating means.
Figure 7 is a diagrammatic view illustrating the functioning of pump and fluid flow valve means embodied in the form of the invention illustrated in Figures 2 and 3.
Figure 8 is a diagrammatic view similar to Figure 7 illustrating the functioning of the pump and fluid flow control arrangement shown in Figure 6.
Figure 9 is an enlarged view of the fluid pump construction illustrated in Figure 3.
Figure 10 is a diagrammatic chart illustrating the characteristics of a typical high speed, high torque induction motor and fluid resistance of orifices of various sizes.

Associated with the member 136 is a housing forming a receptacle adapted to contain oil or other suitable fluid. Disposed within the housing 141 is a fluid pump 147 which may be of any suitable character. In the embodiment illustrated the pump is of the so-called gear type in which rotating meshing gears serve to move or convey fluid through the pump housing 148. The receptacle or housing 141 is provided with a suitable cover plate 149. The plate 149 is held in position by means of securing screws (not shown).

The pump 147 is provided with a pair of vertical shafts 153 and 154 which are arranged in parallelism. The shaft 153 extends exteriorly of the housing 141 and upon which is mounted a gear 155, the latter being in mesh with the teeth of the gear 132 carried by the motor shaft. The gear 155 is fixedly secured to the shaft 153 by means of a suitable key 156. The shaft 153 extends through a suitable stuffing gland or sealing means contained within a bushing 157, the latter being fixedly secured to the housing cover plate 149 by suitable means. Within the pump housing 148 there is fixedly secured to shaft 153 a toothed rotor or gear 160 which meshes with a driven rotor or gear 161 mounted upon the shaft 154. The pump housing 148 is provided with a passage or opening 162 formed in a fitting 163 which is threaded into a bore in the depending portion 164 of the pump housing. A dust or channel 165 is in communication between the opening 162 and the chamber housing the pump gears 160 and 161. This duct 165 is of larger diameter than the opening or passage 162 and disposed within the channel 165 is a check valve 167 preferably of the ball type. The housing 141 is preferably filled with oil or other suitable fluid and I have found it preferably to have the pump mechanism immersed in the fluid, a desired fluid level being indicated at 168.

While the pump mechanism may have a natural "slip" that is, the parts or elements have sufficient clearance for operation which will permit a minute leakage of fluid from the pressure side, and this leakage may be utilized to control the motor speed, I have found that for most satisfactory operation, such "fluid slip" is inadequate. I have therefore provided a fluid metering orifice 169 for predetermining a flow of fluid through the pump and thus the absorption of motor torque for regulating the speed of the motor.

The operation of the form of my invention shown in Figures 1 through 4 is as follows: In moving the work supporting table 14 from one station to a succeeding station the operator may initiate an indexing operation of the work supporting table by manually closing a suitable switch (not shown) which completes an electric circuit through the table actuating motor 45, or in certain types of machine tools the motor circuit may be closed by means of a circuit closing switch automatically operated by means associated with the vertically movable tool carrying head 17. In the latter arrangement, the switch may be moved to circuit closing position by the retraction or upward movement of the head 17, after completion of a work performing operation. Upon energization of the motor 45 by either of the above mentioned means, the shafts 48 and 49 are rotated, thus rotating gears 54 and 55 to cause comparatively slow rotation of shaft 57 by reason of the difference in sizes of gears 54 and 55. The gear 63 at the upper end of the shaft 57 being in mesh with the ring gear 64 rotates the table 14 about the axis of shaft 30. Simultaneously the gear 70 formed on shaft 57 intermediate its ends being in enmeshment with the larger gear 71 causes rotation of shaft 72 at a greatly reduced speed compared to the speed of shaft 57. In the embodiment illustrated, the work supporting table 14 is arranged to have four index positions or stations which are spaced 90 degrees apart, the gears 70 and 71 being so proportioned that with each movement of the table through 90 degrees, that is, from one station to a successive station, the gear 71 and cam member 73 will make one complete revolution.

During rotation of the motor shaft 48 in a direction to revolve the work supporting table 14 in a forward direction, the gears 132 and 155 cause rotation of the pump rotors or gears 160 and 161 in a direction to admit fluid or oil from the supply in receptacle or housing 141 through opening 162 and tube 165 upwardly past the ball check valve 167 into the pump chamber containing the pump rotors thence through an outlet passage 200 and into the receptacle 141. As the pump is rotating in a direction to freely admit fluid into the pump chamber through the passages 162 and 165, no appreciable resistance to the operation of the motor is offered by the pump structure, so that the work supporting table 14 may move comparatively rapidly toward the next station or index position.

As has been previously mentioned herein the work supporting table and the work constituting the load to be moved by the motor 45 very often weighs several thousand pounds which presents a very high inertia factor to be overcome in bringing the work supporting table to rest. The indexed position of the table must be accurately determined in order that the tools carried by the tool carrying head 17 may be brought into proper engagement with the work carried by the table 14. As the work supporting table approaches the next station or position of rest, a projection 82 on the cam or sleeve member 85 is adjusted on the shaft 72 so that when the cam member or disc 73 is approximately in the zone wherein the latching pawl or indexing abutment is in position to engage in the recess 96 formed adjacent the abutment wall 97, the roller 93 of the switch 90 will be actuated by contact with the projection to reverse the current flow through the motor 45. This reversal of current temporarily acts as a brake on the motor to quickly bring the table 14 to a static position ahead of its normal index position. As soon as the table comes to a position of rest, the reversal of motor 45 initiates rotation of the table in a reverse direction toward indexing position, i. e. in a direction to bring the abutment or wall 97 into contact or engagement with the extremity of the latching pawl or indexing arm 98. As soon as the motor comes to rest and prior to its reverse rotation, the pump rotors also cease rotation so that no oil or fluid is moving through the fluid pump. At this moment the ball check valve moves by gravity to its closed position. Reverse rotation of the motor causes a corresponding reversal of movement of the pump rotors 161 and 162 and thus reverse the direction of flow of oil or fluid through the pump. As the ball check valve 167 is in "closed position" it prevents the flow of oil from the pump chamber through the passage 162. The oil or fluid is then extruded through the metering orifice 169 or through the natural slip of the hydraulic pump thus absorbing a major amount of torque of the motor as the cam member 73 is moved in a reverse direction toward index position. This absorption of motor torque greatly reduces the speed of the motor in a reverse direction, the speed being dependent upon the rate of fluid flow through the metering orifice 169. As the torque of the motor is very high under a low speed condition, the table will move slowly in a reverse direction until the abutment wall 97 of cam 73 engages the extremity of the latch pawl 98 to index or predetermine the position of the work supporting table.

At the time the switch mechanism 90 effects a reversal of the motor 45, an automatic time delay circuit controlling mechanism intercalated with the motor circuit is brought into operation, and functions, after a predetermined period of time, to interrupt the circuit to the motor 45 at the termination of a complete indexing cycle. After a machining operation has been completed, the table is again indexed to the next station either by the actuation of a manual switch or by an automatic switch.

In the system and apparatus of my invention I utilize a motor 45 of the induction type having high torque, high slip characteristics, although a direct current or other type of motor having these characteristics may be employed. In motors of this character, the torque factor increases or rises as the motor speed is reduced. Thus the motor torque operative to drive the table or load is exceedingly high so that normally the motor would quickly rise to its top speed. This condition obtains when the motor is rotating in a direction to advance the work supporting table and provides a means for rapidly moving the table and work carried thereby to the next station. The fluid resistance means, which comes into operation upon reversal of the direction of rotation of the motor to finally index the table, absorbs most of the motor torque and thus prevents the motor from driving the table in a reverse direction at a high speed. By pre-determining or metering the fluid by utilizing natural slip of the fluid pump or flow of fluid through the metering orifice 169 or both, the rate of fluid flow determines the rate of rotation of the motor so that the work supporting table is slowly moved into complete indexed position without causing shock, wear or damage to the indexing pawl or latch mechanism.

At the time of completion of an index cycle the safety switch 89 functions to prevent inadvertent closing of the motor circuit so that the work supporting table remains in index position until the tool carrying head 17 has been retracted from the work. After the head 17 is retracted, subsequent movement of the work supporting table may be had either by a manual switch means or automatic switch means controlled by movement of the tool carrying head to its initial position.

Figure 10 of the drawings illustrates a chart showing the typical torque and speed curves of a high slip, high torque motor. In this chart the vertical lines represent the motor speed in revolutions per minute while the horizontal lines represent the motor torque in foot pounds. The curves indicated at $d$, $d-1$, $d-2$ and $d-3$ represent the torque absorbing factors of metering orifices of the different diameters specified in inches. Thus by referring to Figure 10, a metering orifice having a diameter of one hundredth of an inch as indicated at $d$ will admit passage of fluid at a comparatively slow rate thus absorbing most of the motor torque resulting in a comparatively slow motor speed. It will be seen from Figure 10 that while the motor torque is comparatively high at a slow speed, the fluid resistance offered by fluid flowing through a metered orifice offers a correspondingly high resistance to the motor so that by this means an effective speed control may be attained. By varying or changing the size of the fluid orifice the speed of the motor may be changed.

Figure 10 also exemplified a specific operating condition of the motor, load and fluid speed control means of my invention. The curve designated "Motor speed torque curve" illustrates a typical speed, torque curve of a motor delivering maximum torque at zero speed. The curves $d-1$, $d-2$, $d-3$ and $d-4$ illustrate the fluid absorption curves for different rates of fluid flow or fluid metering through the pump. The vertical line A—B represents diagrammatically the torque in foot pounds required for rotating the table or moving the load at a motor speed of approximately 360 revolutions per minute. Considering particularly the form of the invention disclosed in Figures 2, 3 and 7, wherein the direction of rotation of the motor is reversed to bring the table to indexed position, the motor and load come to rest at a point beyond or in advance of the index position. When the motor comes to rest, the ball check or valve 167 falls into contact with its seat and closes the passage 162 in the fitting 163. Immediately upon rotation of the motor and the fluid pump in a reverse direction, the motor torque being highest at zero speed, is decreased as the motor speed increases in accordance with the "motor speed torque curve" of Figure 10. Simultaneously the restricted flow of fluid through the metering orifice 169 absorbs torque from the motor. As the motor speed increases, the fluid absorbs a greater amount of the motor torque. Thus the curve $d-1$, for example, being representative of fluid flow through a round orifice of 20 thousandths of an inch in diameter absorbs torque from the motor very rapidly as the speed of the motor increases. This absorption factor increases until the length of the line CD equals the torque requirements to move the table or load in the reverse direction. The torque in foot pounds represented by the line CD is equal to the torque represented by the line AB. Thus it is to be noted that the distance of the line CD measured horizontally from the vertical base line at the left indicates that the table or load will be moved in a reverse direction at approximately a speed of 75 revolutions per minute. An orifice size is chosen which will reduce the motor speed low enough as not to result in shock or damage to the table indexing mechanism. If extremely heavy loads are required to be moved very slowly, a smaller diameter metering orifice may be utilized. I have found that this arrangement is extremely valuable as a motor control because it makes possible the utilization of a motor capable of developing its highest torque at zero speed for actuating or moving comparatively great loads at a controlled speed simply by regulating the restriction of fluid flow through the pump.

Figure 5:
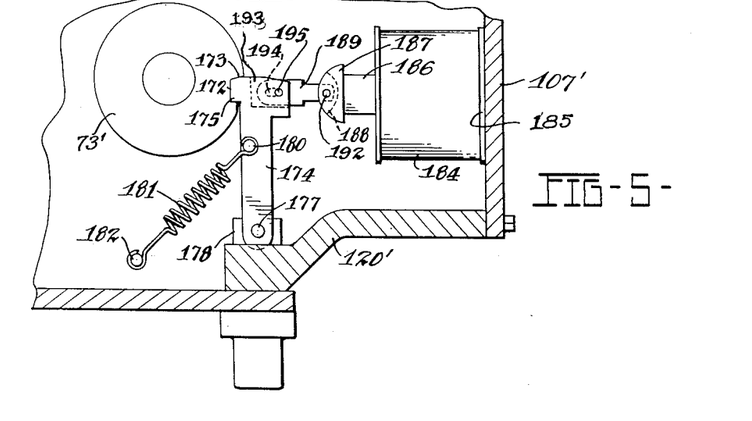
Figure 5 is a plan view illustrating a modified form of table indexing or positioning mechanism, the supporting frame therefor being shown in section.

A modified form of table indexing mechanism and fluid resistance means are shown in Figures 5, 6 and 8 of the drawings. The indexing mechanism illustrated in Figure 5 is inclusive of cam member 73' formed with a recess or kerf 172 which has an entrance wall 173 arranged at an angle with respect to a diameter of the cam member 73'. Arranged to cooperate with the recess 172 is a latching pawl 174 having a tooth or projection 175 arranged to snugly fit into recess 172 for positioning or indexing the work supporting table. The pawl member 174 is pivotally mounted upon a pin 177 carried by a fitting 178 mounted upon member 120'. The latch pawl 174 is provided with a pin 180 connected to one end of a contractile spring 181, the other end of the spring being secured to a fixed portion of the machine by means of a pin 182. The spring 181 provides a resilient means for yieldingly urging the latching member or pawl 174 toward the cam member 73'.

Means is provided for withdrawing the latching pawl 174 from engagement with the cam member 73'. In the embodiment illustrated, this means is in the form of an electrically actuated solenoid 184 mounted upon a plate 185 carried by portion 107' of the machine, the solenoid being provided with a relatively movable armature 186. The armature 186 is provided with a head 187 provided with recess 188 into which extends one end of a link 189. The head 187 is provided with a pin 192 which projects through an opening in the link 189 to establish a pivotal connection between the link and the armature 186. The other end of the link extends in to a recess formed in the latch member 172. The portion of the link 189 extending into the recess 193 is slotted as at 194 to accommodate a pin 195 carried by the pawl member 174. The pin 195 and slot 194 provide a "lost motion" connection between the pawl member 174 and the link 189 so that the link may move a predetermined distance before withdrawing the pawl from the recess 172 and to permit the pawl to be moved into the recess 193 under the influence of spring 181.

The arrangement of fluid pump and fluid flow control mechanism especially adapted for use with the form of indexing mechanism shown in Figure 5 is illustrated in Figure 6. In this form of arrangement the fluid pump 148' is disposed in a housing 141' similar to the fluid containing chamber 141 shown in Figure 9. The pump shaft 153' supports a gear 155' which meshes with a gear 132' mounted upon the motor shaft as in the form of the invention shown in Figure 3. The pump construction 148' is of the rotating gear type and is provided with an inlet passage 200 and an outlet passage 201, the latter being fitted with a tube or pipe 202. The chamber or reservoir formed by the housing 141 contains a supply of oil 203 or other suitable fluid which may be acted upon by the pump 148. Means are provided for interrupting the flow of liquid through the pump in order that the resistance of the fluid may be utilized to absorb torque from table actuating motor. In the embodiment shown in Figure 6, this means is in the form of an electrically actuated valve mechanism 205. This mechanism is inclusive of a solenoid 206 having a core 207 to the lower end of which is pivotedly connected a link 208. The link is threaded as at 209 into a threaded bore formed axially in a cylindrical valve member 210. The interior of the valve is bored as at 212 to accommodate a resilient means or spring 214, the upper end of which is secured to the valve 210 by means of a pin 215, the lower end of the spring being secured to a relatively stationary fitting 216 the latter being securely fastened to the bottom portion of the housing 141' by means of bolts 217. The function of the resilient means or spring 214 is to urge the valve member 210 to its lower-most position as shown in Figure 6. Surrounding the valve 210 is a cylindrical member 218 mounted upon a plate 219. The plate 219 also supports the solenoid mechanism and is secured to the wall of the housing 141' by screws 220 or other suitable means.

The member 218 is formed with a radial channel or passage 221 into which is threaded a fitting 222 for connecting the tube 202 with the member 218. The relationship of the pump, valve mechanism and communicating tube is shown diagrammatically in Figure 8.

The operation of indexing the work supporting table by the motor and the control means therefor as shown in Figures 5 and 6 is as follows:

Electric current is supplied to the motor to rotate the table in a forward direction toward the next indexed position. The current may be supplied by the operator closing a manual switch to complete the motor circuit or by an automatic switch controlled by the position of the tool carrying head 17. During a major part of rotation of the work supporting table from one station to the succeeding station, the solenoid 206 is energized through circuit controlling devices to elevate the valve 210 to a position above the radial channel 221 so that the flow of fluid through the pump 148', tube 202 and passages 221 is unrestricted so that there is no appreciable motor torque absorbed by the pump structure and the torque used to rotate the table at comparatively high speed. As the work supporting table approaches the next successive index position, the switch means 90 is arranged to de-energize the solenoid 206 as well as to energize a delayed action relay (not shown) of conventional design, the latter mechanism being employed to interrupt the motor circuit approximately at the time of completion of the indexing cycle. The de-energization of the solenoid 206 permits the sleeve valve to move to its lower-most position under the influence of spring 214 so as to check the flow of fluid through tube 202 and passage 221 into the fluid supply. As soon as valve 210 interrupts fluid flow, the only fluid which may pass through the pump is that permitted by a metering orifice 224 or by the natural "slip" of the pump so that an immediate torque absorption means is impressed upon the motor by the almost complete obstruction of the flow of fluid through the pump. This means causes the motor to rapidly decrease its speed. This decrease in speed of the motor correspondingly reduces rotation of the work supporting table down to a very low speed so that when the recess 172 in cam 73' is in a position to receive the locking or indexing pawl 175, the work supporting table will be brought to rest. Approximately at the time that the indexing pawl 175 enters the recess 172 in cam member 73', the delayed action relay interrupts the motor circuit to completely de-energize the motor at the time final indexing takes place.

By means of this system and method of motor control, the work supporting table may be rapidly moved by the motor traveling at a high speed to a point near the next station or index position. At this point the motor and work supporting table are rapidly decelerated until at the final point of indexing, the table is moving comparatively slow so that there is little appreciable shock to the indexing mechanism when the indexing position is reached. Thus by this means the indexing mechanism is rendered capable of long life and is not liable to excessive wear. Through the utilization of the motor control arrangement of my invention, the time required to move a work supporting table from one station to a succeeding station is greatly reduced.

It is apparent that, within the scope of the invention, modifications and different arrangements may be made other than is herein disclosed, and the present disclosure is illustrative merely, the invention comprehending all variations thereof.

What I claim is:

1. In combination, a frame; a work supporting table arranged for movement to two or more positions relative to said frame; an electrically energizable motor having high slip, high torque characteristics; means arranged between the motor and the table for transmitting power from the motor to the table; indexing means for determining relatively stationary positions of the table; torque adsorption means including a fluid pump connected to and driven by said motor, valve means for rendering said torque absorption means effective to reduce the speed of said motor and table while said motor is energized, and means dependent upon the relative position of the table for controlling the operation of said valve means.

2. In combination, a frame; a work supporting table arranged for movement to two or more positions relative to said frame; an electrically energizable motor having high slip, high torque characteristics; mechanical means arranged between the motor and the table for transmitting power from the motor to the table; indexing means for determining successive relative stationary positions of the table; said means including a table locking mechanism; torque absorption means including a fluid pump connected to and driven by said motor, and valve means for rendering said torque absorption means effective while said motor is energized to reduce the speed of said motor and table when said table approaches an index position, and means dependent upon the relative position of the table for controlling the operation of said valve means.

3. In combination, a machine having a rotatable table; an electrically energized motor having high slip, high torque characteristics; power transmission mechanism disposed between said motor and said table whereby the table is driven by the motor; means for indexing the table selectively in several positions; fluid torque absorption means including a gear pump connected to and adapted to be driven by said motor; valve means for restricting fluid flow whereby torque is absorbed from the motor to reduce the speed thereof as the table moves adjacent an index position; means for controlling said valve means, and a metering orifice associated with said fluid torque absorption means to provide for minute flow of fluid to cause said motor to operate at a slow speed as the table approaches index position.

4. In combination, a machine having a rotatable table; an electrically energized motor having high slip, high torque characteristics; power transmission mechanism disposed between said motor and said table whereby the table is driven by the motor; means for positioning the table selectively in several positions including a cam associated with said power transmission mechanism and movable simultaneously with said table; said cam having an abutment; means adapted to be engaged by the abutment on said cam to determine a table position; fluid torque absorption means including a gear pump connected to and adapted to be driven by said motor; valve means for restricting fluid flow through the torque absorption means whereby torque is absorbed from the motor to reduce the speed thereof; and electrically controlled means for rendering said valve means effective, and a metering passage in said fluid torque absorption means providing for reduced flow of fluid to maintain a relatively slow controlled speed of the motor until the table attains a selected position.

5. In combination, a machine tool having a rotatable work supporting table; an electrically energized induction motor having high slip, high torque characteristics; gearing disposed between said motor and said table whereby the table is driven by the motor; means for positioning the table selectively in several positions including a cam associated with said gearing and rotatable simultaneously with said table; said cam having an abutment; a pawl adapted to be engaged by the abutment on said cam to determine a table position; torque absorption means including a fluid pump connected to and adapted to be driven by said motor; valve means for restricting fluid flow through said pump whereby torque is absorbed from the motor to reduce the speed thereof; means dependent upon the relative position of the table for controlling the operation of said valve means, and a metering orifice providing for limited flow of fluid whereby said energized motor operates with high torque at relatively low speed at the time the pawl engages said abutment.

6. In a machine tool in combination, a work supporting table adapted to be moved to several stations; an electrically energizable motor having high slip, high torque characteristics; power transmission gearing whereby said table is adapted to be driven by the motor; indexing mechanism for positioning the table at each successive station; torque absorption means including a fluid pump connected to and driven by said motor; a reservoir containing a supply of fluid for the pump; valve means for restricting the normal flow of fluid through said pump; a metering orifice bypassing said valve means to permit limited flow of fluid through said pump when said valve is in closed position whereby the speed of said motor is reduced through the absorption of torque from the motor under the influence of restricted fluid flow through said pump, and means set into operation upon the table approaching a station for actuating said valve means, said motor being electrically energized until said table attains an indexed position.

7. In a machine tool in combination, a revolvable work supporting table adapted to be moved to several stations; an electrically energizable motor having high slip, high torque characteristics; power transmission gearing whereby said table is adapted to be driven by the motor; indexing mechanism for positioning the table at each successive station; torque absorption means including a rotary fluid pump connected to and adapted to be driven by said motor; a fluid reservoir surrounding said fluid pump and containing a supply of fluid; valve means for restricting the normal flow of fluid through said pump; a metering orifice bypassing said valve means to permit limited flow of fluid through the pump when said valve is in closed position whereby the speed of the electrically energized motor is reduced through the absorption of torque from the motor under the influence of restricted fluid flow through said pump until said table attains an indexed position, and electrically energizable means set into operation upon the table approaching a station for actuating said valve means.

8. In a machine tool in combination; a revolvable work supporting table adapted to be moved to several stations; an electrically energizable motor having high slip, high torque characteristics; power transmission means asociated with said motor whereby said table is adapted to be driven by the motor; indexing mechanism for positioning the table at each successive station; fluid torque absorption means connected to and adapted to be driven by said motor; a reservoir for said torque absorption means containing a supply of fluid; a check valve associated with said torque absorption means adapted to provide for substantially unrestricted flow of fluid when the motor is rotating in one direction; said check valve aranged to restrict the flow of fluid through said pump when the motor is electrically energized for rotation in a reverse direction, and means bypassing said valve for conveying fluid through said pump in restricted quantities whereby the flow of fluid through said bypass means controls the speed of rotation of the motor and revolvable work supporting table during reverse rotation to an index position, and means associated with the table for effecting the reversal of said motor.

THOMAS L. HALLENBECK.

REFERENCES CITED

The following references are of record in the file of this patent:

UNITED STATES PATENTS

| Number | Name | Date |
|---|---|---|
| 1,975,007 | Kingsbury | Sept. 25, 1934 |
| 2,011,486 | Kingsbury | Aug. 13, 1935 |
| 2,053,400 | Kingsbury | Sept. 8, 1936 |
| 2,186,225 | Wrathall | Jan. 9, 1940 |
| 2,192,437 | Groene et al. | Mar. 5, 1940 |
| 2,244,463 | Kingsbury et al. | June 3, 1941 |
| 2,395,020 | Sternad | Feb. 19, 1946 |
| 2,429,938 | Mansfield | Oct. 28, 1947 |
| 2,465,154 | Harstick | Mar. 22, 1949 |
| 2,552,041 | Hallenbeck | May 8, 1951 |